United States Patent [19]

Wright et al.

[11] Patent Number: 4,593,442
[45] Date of Patent: Jun. 10, 1986

[54] CABLE INSTALLATION APPARATUS

[76] Inventors: Curtis M. Wright, Ellis Hill Rd., Dundee, N.Y. 14837; Charles Wray, 56 E. Green Woods St., Andover, N.Y. 14806

[21] Appl. No.: 745,076

[22] Filed: Jun. 17, 1985

[51] Int. Cl.[4] .............................................. B23P 19/02
[52] U.S. Cl. ........................................................ 29/235
[58] Field of Search .................................... 29/235, 234

[56] References Cited

U.S. PATENT DOCUMENTS

| | | |
|---|---|---|
| 1,513,937 | 11/1924 | Seidler . |
| 2,692,092 | 10/1954 | Kinsinger . |
| 3,448,508 | 6/1969 | Passage et al. ........................ 29/235 |
| 3,488,828 | 1/1970 | Gallagher ............................. 29/235 |
| 3,550,242 | 12/1970 | Sarray et al. ......................... 29/235 |
| 3,561,222 | 2/1971 | Sweeton et al. . |
| 4,185,371 | 1/1980 | Barnett ................................. 29/235 |
| 4,201,607 | 5/1980 | Rautenberg et al. . |
| 4,212,097 | 7/1980 | Portinari et al. .................... 29/234 |
| 4,279,470 | 7/1981 | Portinari et al. . |

*Primary Examiner*—James L. Jones, Jr.
*Attorney, Agent, or Firm*—Mason, Fenwick & Lawrence

[57] ABSTRACT

Apparatus for manually separating a pipe or other conduit of resilient material having a pre-cut longitudinal slit therein and inserting a flexible cable or other flexible line therein comprises a pair of arms, each of which has a handle end and a head end, a handle disposed between and joining the handle ends, a head disposed between and attached to the head ends, and a head. The head comprises a top half and a bottom half. The bottom half is unitary in construction and comprises a wedge-separating member. The top and bottom halves include semicircular grooves, which when joined together form a substantially circular channel for guiding the cable.

20 Claims, 5 Drawing Figures

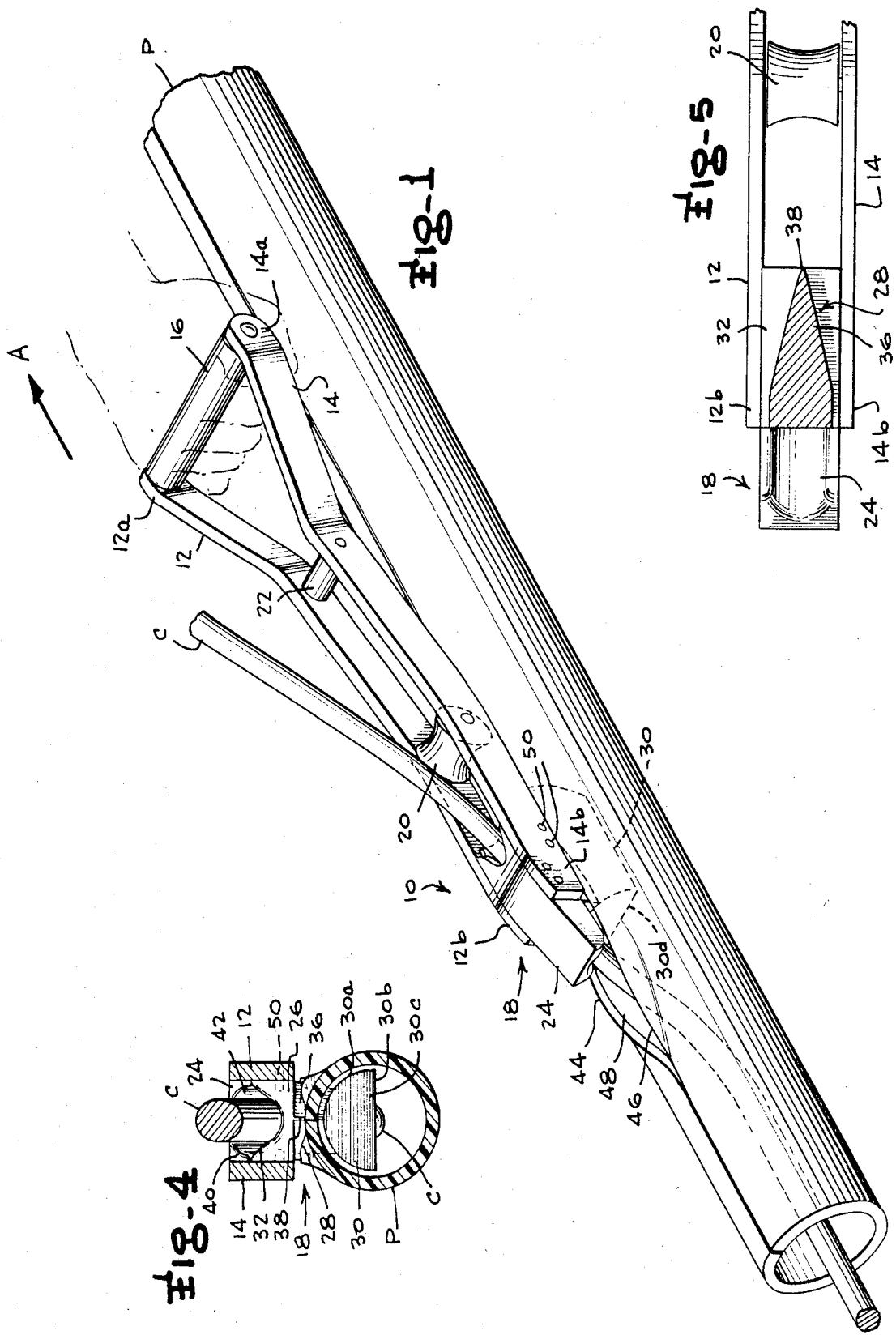

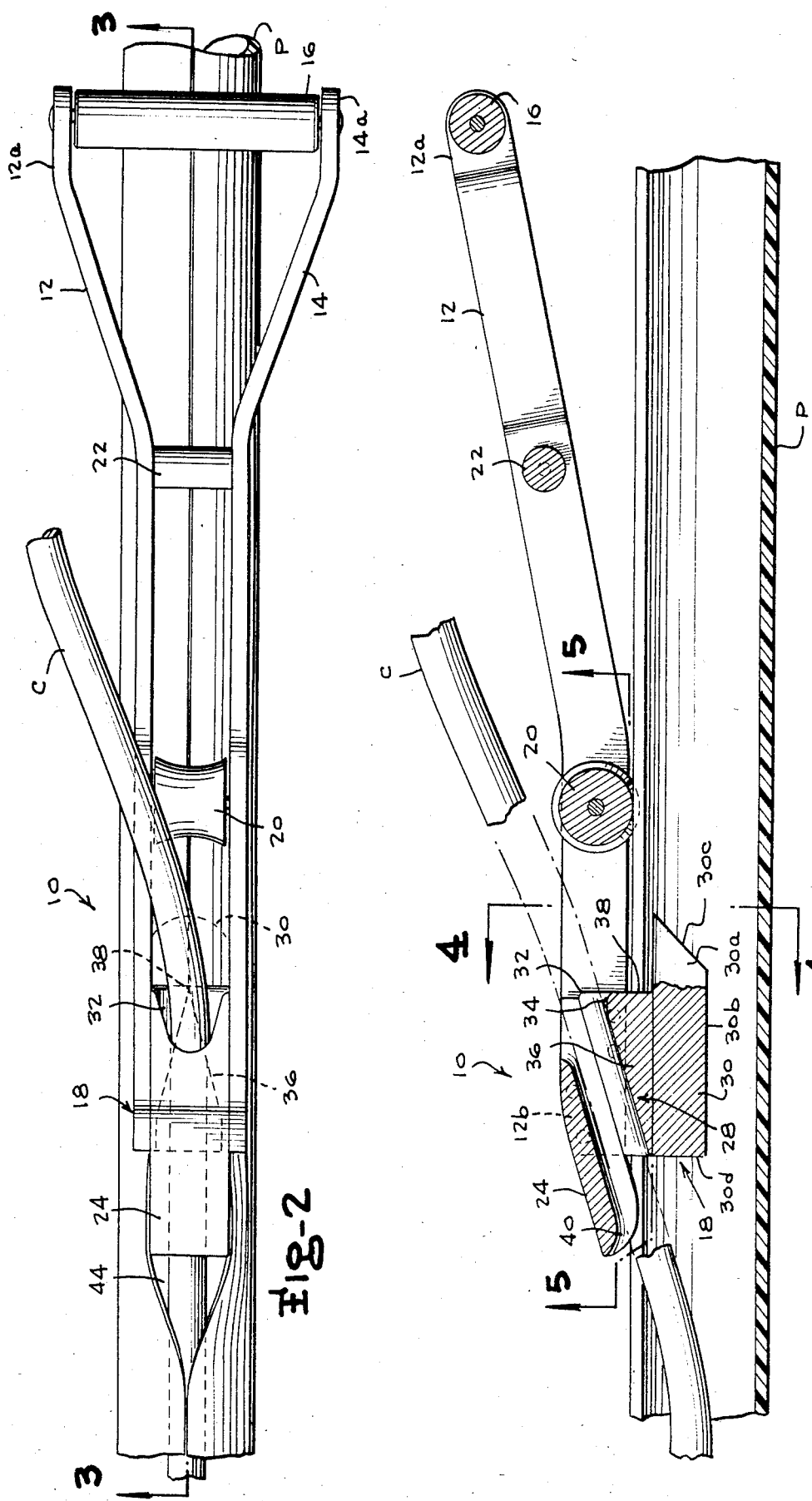

CABLE INSTALLATION APPARATUS

BACKGROUND OF THE INVENTION

The present invention is directed to the field of cable installation, and more specifically to apparatus for manually separating a pre-slit pipe or other conduit of resilient material and inserting a flexible cable or other flexible line therein.

Tools for laying cable or other flexible line directly in the ground have long been known, as illustrated by U.S. Pat. No. 1,513,937 to A. Seidler, U.S. Pat. No. 2,692,092 to A. Kinsinger, and U.S. Pat. No. 3,561,222 to J. Sweeton, et al. However, in order to protect the cable or other line from damage due to exposure, it is often desirable to insert the cable or other line in a pipe or other conduit. The tools disclosed by Seidler, Kinsinger, and Sweeton et al. are not suitable for this purpose.

Other devices have been developed which are particularly applicable to installing fiber optic cable in a tube and which insert the cable into the tube through a slit in the tube. Examples of such devices are shown in U.S. Pat. No. 4,201,607 to Rautenberg et al. and U.S. Pat. Nos. 4,212,097 and 4,279,470 to Portinari et al. However, these devices are adapted for use in the context of a large-scale manufacturing operation employing automation to move the device relative to the tube, and are not suitable for on-site installation of the cable (i.e. installation of cable in a conduit in the ground or about to be placed in the ground).

It is a well known problem in the art of on-site cable installation that full reels of cable, particularly fiber optic cable, cannot be installed on-site in a conduit without the need for splicing the cable. However, splicing cable, particularly fiber optic cable, results in undesirable resistance. Previously, there were only two ways to avoid cutting and splicing the cable. The first was to mechanically split in half the pipe or conduit for the cable at the factory and rejoin it with nuts and bolts in the field, after the cable was inserted. Splitting the pipe or conduit has the disadvantage of requiring that the exact amount of pre-split conduit or pipe be ordered, shipped, and carried in stock. Moreover, the pre-split conduit or pipe is fairly expensive. The second way is through careful on-site design layout. However, a design layout which avoids the need for cutting and splicing the cable often cannot accommodate a change in plans. It is the solution of these problems to which the present invention is directed.

SUMMARY OF THE INVENTION

Therefore, it is a primary object of the invention to provide apparatus for installing a full reel of cable in a pipe which avoids the necessity splitting of pipe in half.

It is another object of the invention to provide apparatus for installing a full reel of cable in a pipe which avoids the necessity of complicated design layout.

It is still another object of the invention to provide apparatus for installing a full reel of flexible cable in a pipe which can be used with commonly available pipe.

The foregoing and other objects are achieved by provision of apparatus for manually separating a pipe or other conduit of resilient material which has been pre-slit longitudinally and inserting a flexible cable or other flexible line therein. The apparatus comprises a pair of arms, each of which has a handle end and a head end, a handle disposed between and joining the handle ends, a head disposed between and attached to the head ends, and a head. The head comprises a top half and a bottom half. The bottom half is unitary in construction and comprises a wedge-shaped separating member and a guide shoe disposed beneath the separating member. The top and bottom halves include semicircular grooves, which when joined together form a substantially circular channel for guiding the cable.

BRIEF DESCRIPTION OF THE DRAWINGS

FIG. 1 is a perspective view of the apparatus according to the invention showing usage of the apparatus in installing a flexible cable in a pipe of resilient material;

FIG. 2 is a top elevational view of the apparatus shown in FIG. 1;

FIG. 3 is a cross-sectional view of the apparatus shown in FIG. 2, taken along line 3—3 of FIG. 2;

FIG. 4 is a cross-sectional view of the apparatus shown in FIG. 3, taken along line 4—4 of FIG. 3; and FIG. 5 is a cross-sectional view of the apparatus shown in FIG. 3, taken along line 5—5 of FIG. 3.

DESCRIPTION OF THE PREFERRED EMBODIMENTS

Referring now to FIGS. 1-3, there is illustrated pipe separating and cable insertion apparatus according to the invention designated generally by the reference numeral 10 in use separating a longitudinally pre-slit pipe P and inserting a flexible cable C or other flexible line therein. Apparatus 10 comprises a pair of spaced-apart arms 12 and 14 having respective handle ends 12a and 14a and respective head ends 12b and 14b, a handle 16 disposed between and joining handle ends 12a and 14a for gripping the apparatus 10 in operation, a head 18 disposed between and attached to head ends 12b and 14b for separating the pipe P and inserting the cable C, and a roller guide 20 disposed between and rotatably attached to arms 12 and 14 forward of head 18 for guiding the cable C into head 18. A brace 22 can be attached between arms 12 and 14 approximately midway between guide 20 and handle 16 to stabilize the apparatus.

Arms 12 and 14 are substantially parallel along their length between head ends 12b and 14b and approximately the point where brace 22 is attached, and diverge the remainder of their length so as to accommodate handle 16 between handle ends 12a and 14a. In order to provide maximum leverage, arms 12 and 14 include a bend in the vicinity where roller guide 20 is attached. This bend allows arms 12 and 14 at and adjacent head ends 12b and 14b to be positioned parallel to pipe P and at an angle to pipe P at and adjacent handle ends 12a and 14a.

Referring now to FIGS. 3-5, head 18 comprises a top half 24 and a bottom half 26. Bottom half 26 is unitary in construction and comprises a separating member 28, a guide shoe 30, and means 32 defining with member 28 a semicircular groove 34. Guide shoe 30 is disposed beneath separating member 28 and has an upper surface 30a shaped to conform to the upper inner surface of pipe P, a lower surface 30b, a leading edge 30c, and a trailing edge 30d. For a pipe P having a circular cross-section as shown, upper surface 30a is substantially semicircular in cross-section and bottom surface 30b is flat, while leading edge 30c forms an obtuse angle with bottom surface 30b and trailing edge 30d forms a right angle with bottom surface 30b. For a pipe having other than a circular crosssection, guide shoe 30 can be shaped accordingly.

As shown in FIG. 5, member 28 comprises a wedge 36 having a pointed forward apex 38 facing handle 6 for separating pipe P. Top half 24 of head 18 includes a semicircular groove 40. When top half 24 is placed over bottom half 26 of head 18 and held in position by connector means comprising machine screws 50 or the like. Semicircular grooves 40 and 34 form a guide opening channel 42 for guiding cable C along a path of travel above apex 38 of wedge 36 and through wedge 36 at an angle to arms 12 and 14 and into pipe P.

In use, cable C is placed in semicircular groove 32 of bottom half 26 of head 18. Top half 24 of head 18 is then secured to bottom half 26, forming channel 42. Cable C thus does not have to be cut to feed it into apparatus 10 at the beginning of the installation process. Apex 38 of wedge 36 is aligned with longitudinal slit 44 and guide shoe 30 is aligned against the upper inside surface of pipe P. Apparatus 10 is then drawn along pipe P in the direction of the arrow A. As apex 38 of wedge 36 comes into contact with edges 46 and 48 of slit 44, wedge 36 forces apart edges 46 and 48, creating a gap 48 in the top of pipe P through which cable C is fed. Because pipe P is resilient, slit 44 closes as cable C falls to the interior of pipe P.

Thus, it will be seen that the present invention provides a unique method of separating a longitudinally pre-slit resilient pipe or other conduit and inserting a flexible cable or other flexible line therein. Moreover, the operation of the apparatus is both effective and easy to accomplish so as to render its use convenient to users. While a preferred embodiment of the invention has been disclosed, it should be understood that the spirit and scope of the invention is to be limited solely by the appended claims, since numerous modifications of the disclosed embodiment will undoubtedly occur to those of skill in the art.

We claim:

1. Apparatus for manually separating a conduit of resilient material having a pre-cut longitudinal slit therein and inserting a flexible line therein, comprising:
   a pair of arms, each of said arms having a handle end and a head end;
   a handle disposed between and joining said handle ends for gripping said apparatus in operation; and
   a head disposed between and attached to said head ends for separating the slit in the conduit and inserting the line through the slit, said head comprising:
      a removable top half having a first semicircular groove therein and a bottom half on which said top half is positioned for normal use and comprising:
   a separating member for separating the slit in the conduit;
   a guide shoe disposed beneath said separating member and having an upper surface generally conforming to the upper inner surface of the conduit for guiding said separating member along the conduit; and
   means defining with said separating member a second semicircular groove, whereby when said top half is placed over said bottom half, said first and second semicircular grooves form a substantially circular channel for guiding the line through said separating member at an angle to said arms and into the conduit.

2. The apparatus of claim 1, said separating member comprising a wedge having a forward apex facing said handle for separating the slit in the conduit.

3. The apparatus of claim 2, wherein said guide shoe has an upper surface, a lower surface, a leading edge, and a trailing edge, said upper surface being shaped to conform to the upper inner surface of the conduit.

4. The apparatus of claim 3, wherein said upper surface of said guide shoe is semicircular in cross-section, said bottom surface is flat, said leading edge forms an obtuse angle with said bottom surface, and said trailing edge forms an angle of approximately 90° with said bottom surface.

5. The apparatus of claim 1, further comprising a roller guide disposed between and attached to said arms adjacent said head for guiding the line into said head.

6. The apparatus of claim 5, wherein each of said arms has a bend therein in the vicinity where said roller guide is attached thereto, whereby in use, said arms at and adjacent said head ends will be positioned parallel to the conduit, and said arms at and adjacent said handle ends will be at an angle to the conduit.

7. The apparatus of claim 1, wherein said bottom half is unitary in construction.

8. Apparatus for manually separating a conduit of resilient material having a pre-cut longitudinal slit therein and inserting a flexible line therein, comprising:
   a pair of arms, each of said arms having a handle end and a head end;
   a handle disposed between and joining said handle ends for gripping said apparatus in operation;
   a head disposed between and attached to said head ends for separating the slit in the conduit and inserting the line through the slit, said head comprising:
      a removable top half having a first semicircular groove therein and
      a bottom half on which said top half is positioned for normal use comprising:
         a separating member for separating the slit in the conduit;
         a guide shoe disposed beneath said separating member and having a substantially semicircular cross section; and
         means defining with said separating member a second semicircular groove, whereby when said top half is placed over said bottom half, said first and second semicircular grooves form a substantially circular channel for guiding the line through said separating member at an angle to said arms and into the conduit; and
   a roller guide disposed between and attached to said arms adjacent said head for guiding the line into said head.

9. Apparatus for inserting an elongated flexible member into a conduit having a longitudinal slit therein, including:
   a rigid support frame;
   a separating member mounted on said support frame so as to be movable along said slit for momentarily separating the slit in the conduit to provide a momentary slit opening to the rear of said separating member;
   guide means disposed adjacently beneath said separating member and including means defining a guide opening substantially encircling said elongated flexible member for guiding said elongated flexible member axially through said slit opening into the conduit while precluding transverse movement of the flexible member from said guide means during use; and wherein said means defining said guide opening includes a movable member which can be moved away from other portions of said guide means to provide an opening through which said elongated flexible member can be transversely moved for positioning in or removal from said guide means.

10. The apparatus of claim 9, wherein said separating member comprises a wedge having a forward edge for separating the slit in the conduit.

11. The apparatus of claim 10, wherein said guide means having an upper surface shaped to conform to the upper inner surface of the conduit.

12. The apparatus of claim 11, wherein said upper surface of said guide means is semicircular in cross-section.

13. The apparatus of claim 9, additionally including a guide disposed forwardly of said guide means for guiding the elongated flexible member into said guide opening.

14. The apparatus of claim 9, wherein the means defining said guide opening comprise a lower fixed member having an upwardly facing semicircular slot and said movable member, said movable member having a downwardly facing semicircular slot in facing alignment with said upwardly facing semicircular slot.

15. The apparatus of claim 9, additionally including handle means on said rigid support frame forwardly of said separating member.

16. The apparatus of claim 15, wherein said separating member comprises a wedge having a forward apex facing said handle means.

17. The apparatus of claim 16, said guide means being of substantially greater transverse dimensions than said wedge means.

18. The apparatus of claim 17, additionally including a roller guide mounted on said rigid support frame forwardly of said guide means for guiding said elongated flexible member into said guide opening.

19. The apparatus of claim 18, wherein said guide means has a semicircular upper surface.

20. The apparatus of claim 19, wherein said means defining said guide opening comprise a lower fixed member having an upwardly facing slot and said movable member, said movable member having a downwardly facing slot aligned with said upwardly facing slot when in its operable position for defining said guide opening and further including connector means for normally holding said movable member in its operable position but being disconnectable therefrom to permit bodily removal of the movable member to fully expose the upwardly facing slot.

* * * * *